United States Patent
Rajabi et al.

(12)

(10) Patent No.: US 6,460,571 B1
(45) Date of Patent: Oct. 8, 2002

(54) CRIMPED PISTON/MEMBRANE ACCUMULATOR

(75) Inventors: Bahram S. Rajabi, Belvidere; Allen R. Hansen, Winnebago, both of IL (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 10/026,185

(22) Filed: Dec. 19, 2001

Related U.S. Application Data

(60) Provisional application No. 60/275,348, filed on Mar. 13, 2001, and provisional application No. 60/332,898, filed on Nov. 14, 2001.

(51) Int. Cl.⁷ .............................................. F16L 55/04
(52) U.S. Cl. ............................. 138/31; 138/30; 138/26; 138/109
(58) Field of Search ............................. 138/30, 31, 26, 138/96 R, 109

(56) References Cited

U.S. PATENT DOCUMENTS

| | | | | |
|---|---|---|---|---|
| 2,748,801 A | | 6/1956 | McCuiston | 138/31 |
| 3,408,731 A | | 11/1968 | Mercier | 29/511 |
| 3,757,523 A | | 9/1973 | Resuggan | 138/31 X |
| 3,837,354 A | | 9/1974 | Farr | 137/118 |
| 4,448,217 A | | 5/1984 | Mercier | 138/30 |
| 4,595,038 A | * | 6/1986 | Wege | 138/31 |
| 4,793,381 A | * | 12/1988 | Sugimura | 138/30 |
| 5,311,910 A | | 5/1994 | Hasegawa et al. | 138/31 |

FOREIGN PATENT DOCUMENTS

| | | |
|---|---|---|
| DE | 3258070 A1 | 2/1986 |
| DE | 40 02 558 C2 | 8/1990 |
| DE | 41 06 472 C2 | 9/1992 |

OTHER PUBLICATIONS

Drawing submitted in Provisional Application Ser. No. 272,348. Applicants request the Examiner to consider this reference as prior art under 102(a), however, Applicants respectfully reserve the right to supplement this Information Disclosure Statement and take a contrary position should it be necessary.

* cited by examiner

*Primary Examiner*—Patrick Brinson
(74) *Attorney, Agent, or Firm*—Christopher H. Hunter; Joseph J. Pophal

(57) ABSTRACT

An accumulator for a fluid system includes a canister and an end cap at one or both ends of the canister. The end cap has a cylindrical peripheral surface, with a groove or channel having gradually rounded or curved sidewalls, formed circumferentially around the cap, and spaced from the axial ends of the cap. An annular, radially-outward projecting flange is provided at the axially outer end of the cap, and serves as a locating feature for the cap when it is inserted into the canister. A forming tool such as a crimping machine is used to mechanically deform the canister into the groove. The rounded shape of the groove creates a permanent, fluid-tight attachment with the canister. The accumulator can include either a piston or bladder.

22 Claims, 5 Drawing Sheets

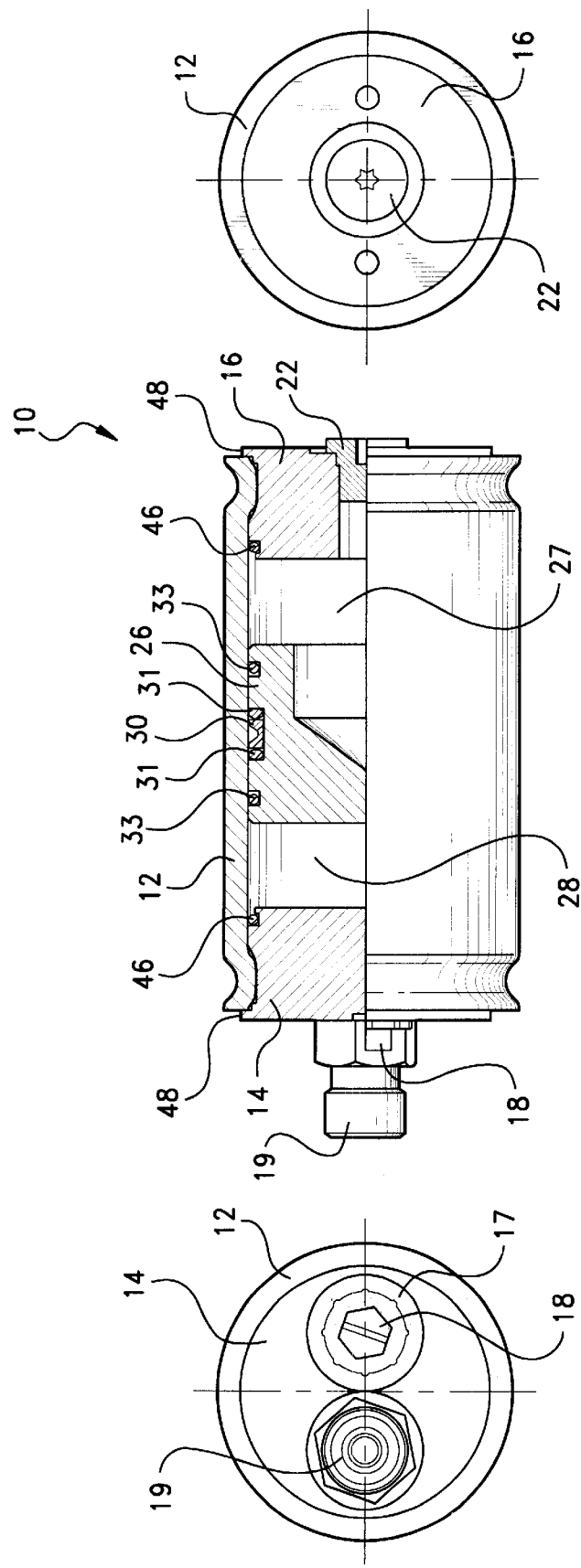

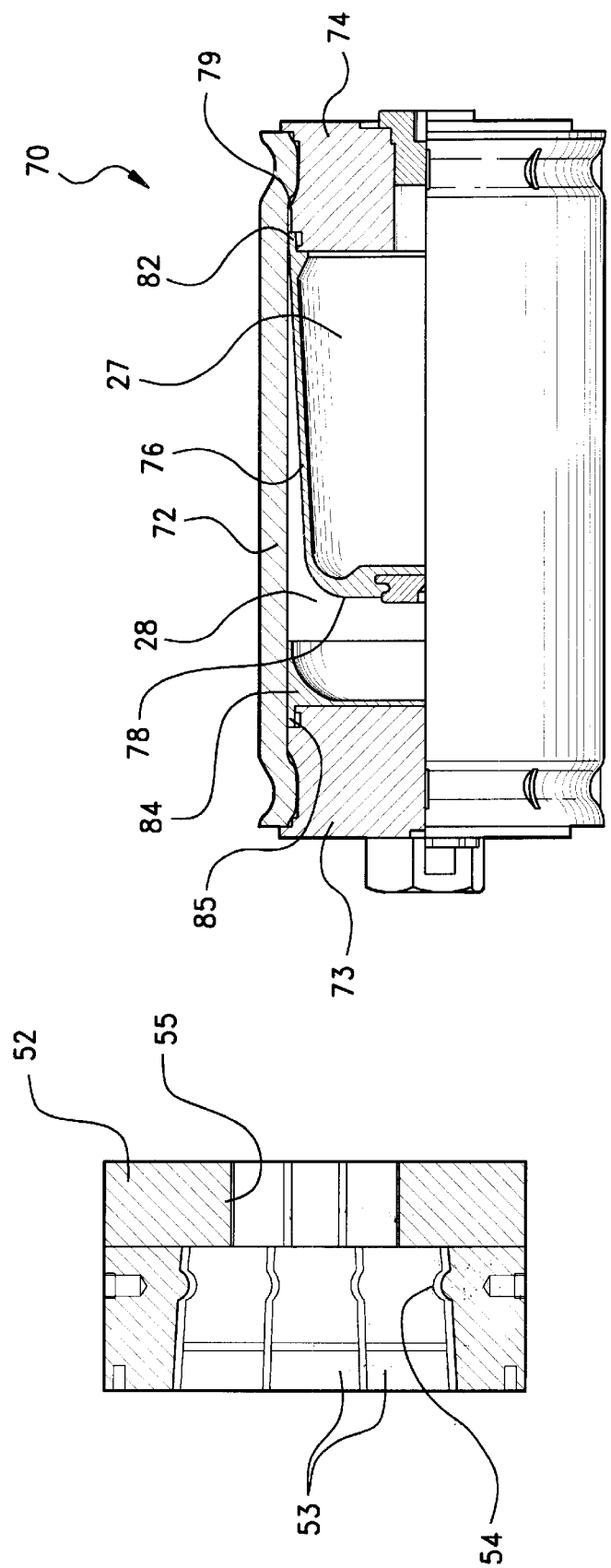

_US 6,460,571 B1_

CRIMPED PISTON/MEMBRANE ACCUMULATOR

RELATED CASES

The present application claims priority to U.S. Provisional Application Serial No. 60/275,348; filed Mar. 13, 2001 and U.S. Provisional Application Serial No. 60/332,898; filed Nov. 14, 2001.

FIELD OF THE INVENTION

The present invention relates generally to accumulators for fluid pressure operated devices and systems.

BACKGROUND OF THE INVENTION

Accumulators are well-known for storing excess fluid under pressure within a fluid system. Two accumulators which are widely used in the industry are bladder-type accumulators and piston-type accumulators. In the bladder-type accumulator, an elastic bladder is fluidly-sealed at its opening to a fluid tube or to the walls of a canister, and expands and contracts within the canister depending on the volume of fluid entering one end of the canister. Examples of such bladder-type accumulators are shown in U.S. Pat. Nos. 3,408,731 and 4,448,217. The resiliency of the bladder, sometimes in conjunction with a volume of gas surrounding the bladder, tends to urge the bladder into a collapsed or uncharged/exhausted state in the canister.

In a piston-type accumulator, a piston is moveably positioned within an elongated canister, and slides axially depending on the volume of fluid entering one end of the canister. One or more annular seals are provided around the periphery of the piston to maintain a fluid seal with the walls of the housing, and a resistance device, such as a spring, cushion or volume of gas, is provided against the side of the piston opposite from the inlet to urge the piston toward the inlet into an uncharged/exhausted position. Examples of such piston-type accumulators are shown in U.S. Pat. Nos. 2,748,801, 3,757,523 and 3,837,354.

The choice between a piston or bladder depends on the particular application, which should be well-known to those skilled in the art.

In many bladder and piston-type accumulators, a plug or end cap is provided at one or both ends of the accumulator housing. Since the housing must withstand significant pressures, many techniques have been developed in an attempt to create a firm and fluid-tight attachment of each end cap to the housing. Techniques such as bending or rolling over an end of the casing, or threadably attaching an end cap to the canister are known (see, e.g., U.S. Pat. No. 2,748,801 FIGS. 1 and 2). It is also known to create a raised bead or flange surrounding the periphery of the end cap, and then crimping or staking the housing over the bead, as described in U.S. Pat. Nos. 3,837,354 and 5,311,910. It is further known to attach the end cap to the housing with screws, such as shown in U.S. Pat. No. 3,757,523, or by welding. In many of these techniques, however, it is apparent that the assembly and manufacturing steps are time-consuming and/or difficult, and it is believed that some accumulators have fatigue issues in certain higher-pressure applications, and hence have undesirably short operating lifetimes. Other of these techniques (such as welding) are faster, but can damage or degrade O-ring seals and rubber packing materials associated with the end caps, if not carefully monitored and controlled.

Thus, it is believed there is a demand in the industry for a new accumulator, and a new technique for retaining an end cap to a canister of an accumulator, which is relatively straightforward, and which maintains a permanent and fluid-tight attachment under operating pressures.

SUMMARY OF THE PRESENT INVENTION

The present invention provides an improved accumulator for a fluid system, and a method for manufacturing such an accumulator, which is relatively straightforward in that it uses conventional forming machinery and has few steps, and maintains a permanent and fluid-tight attachment of the end cap(s) to the canister.

According to the present invention, the accumulator includes a canister and an end cap at one or both ends of the canister. Each end cap has a generally cylindrical peripheral surface, with a groove or channel having gradually tapered or curved walls, formed circumferentially around the peripheral surface of the cap, and spaced from the axial ends of the cap. An annular, radially-outward projecting flange or step is provided at the axially outer end of the cap, and serves as a locating feature for the cap when it is inserted into the canister. Once the cap is inserted into the canister and located via the flange, a forming tool such as a crimping machine is used to mechanically deform the canister into the groove. The rounded shape of the groove creates a permanent, fluid-tight seal with the canister.

The accumulator of the present invention can be used with either a piston or bladder, depending upon the particular application. The piston and bladder are preferably of a type generally known, and include an appropriate fluid-tight seal with the walls of the accumulator.

Thus, the present invention provides an improved accumulator, and method for manufacturing such an accumulator, which is relatively straightforward and maintains a firm and fluid-tight attachment of an end cap to the canister. Further features and advantages of the present invention will become apparent to those skilled in the art upon reviewing the following specification and attached drawings.

BRIEF DESCRIPTION OF THE DRAWINGS

FIG. 2 is a side view in partial cross-section of the accumulator of FIG. 1;

FIG. 3 is an end view from the left side of the accumulator as viewed in FIG. 2;

FIG. 4 is an end view from the right side of the accumulator as viewed in FIG. 2;

FIG. 9 is a cross-sectional side view of the die for forming the accumulator; and FIG. 10 is a side view in partial cross-section of an accumulator similar to that shown in FIG. 1, but with a bladder.

DETAILED DESCRIPTION OF THE PREFERRED EMBODIMENT

Figure 1:
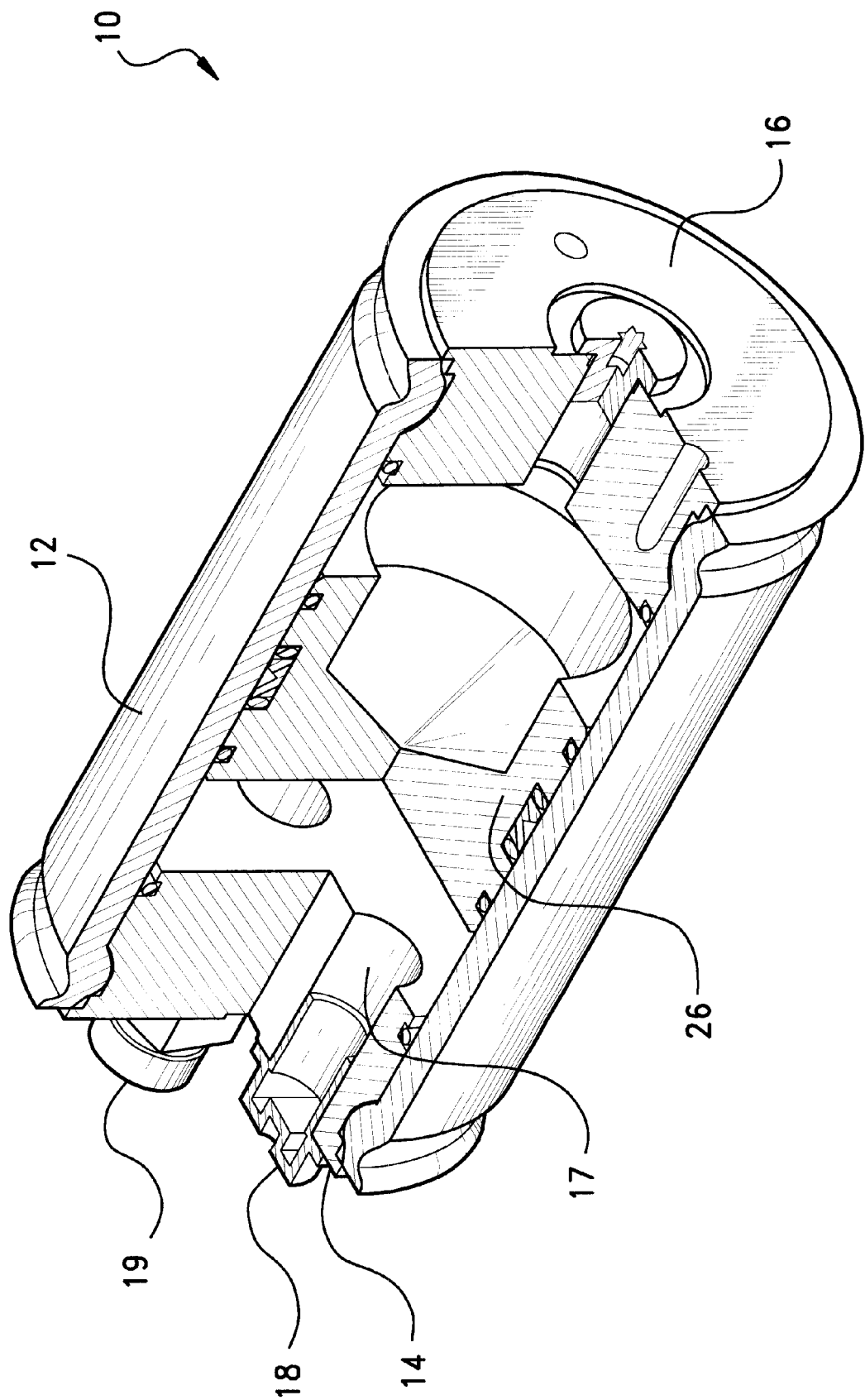
FIG. 1 is an elevated, partially cut-away perspective view of an accumulator constructed according to the principles of the present invention.

Referring to the drawings, and initially to FIGS. 1–4, an accumulator constructed according to the principles of the present invention is indicated generally at 10. The accumulator 10 is intended for use in a fluid system such as a hydraulic fluid system, but is generally applicable to any fluid system where an excess of fluid needs to be stored under pressure during certain operating conditions of the system.

The accumulator 10 includes an outer canister 12, having an elongated, cylindrical shape, with a first ("hydraulic") end cap 14 at one end of the canister, and a second ("gas") end cap 16 at the other end of the canister. The first end cap 14 has a solid cylindrical configuration with a fluid port 17 (shown with a storage cap 18) which enables the accumulator to be connected with the fluid system. A check valve or bleed/drain port 19 can also be provided in first end cap 14.

The opposite end cap 16 also has a solid cylindrical configuration with a plug or bung 22 which can be removable (such as by a screw attachment) to allow charging of the canister with a gas such as nitrogen. Alternatively, the plug can be permanently attached to the second end cap Canister 12 and end caps 14, 16 are formed out of material appropriate for the particular application, such as steel.

In the embodiment illustrated in FIGS. 1–4, the accumulator is of a piston-type, and includes a cylindrical piston 26 located within the canister and dividing the canister into a gas chamber 27 and a working fluid chamber 28. Piston 26 is axially slideable within the canister from one end to the other, and has a generally smooth outer surface, with one or more annular channels or grooves formed therein to receive sealing rings and annular packing material to maintain a fluid-tight seal between the gas chamber 27 and the fluid chamber 28 as the piston reciprocates. Various types of elastomeric sealing rings and packings can be used, depending upon the particular application, as should be well-known to those skilled in the art. One useful combination includes a V-ring 30 centrally located around the piston, and supported on either side by a back-up ring 31. A further O-ring 33 can be located toward either axial end of the piston to further improve the seal with the canister. Again, this is only one illustration of a sealing ring and packing combination, and other combinations could be used.

Figure 6:
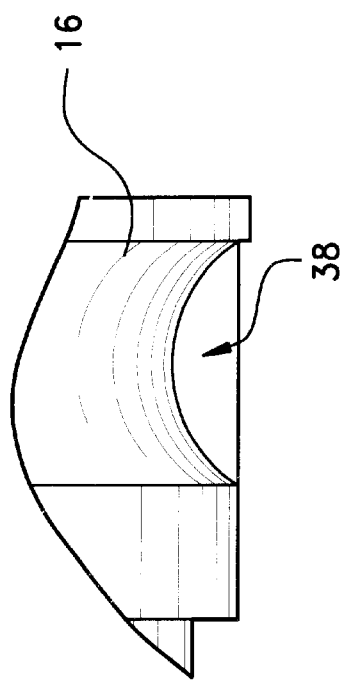
FIG. 6 is a side view of a portion of the end cap for the accumulator showing a further embodiment of the end cap.
Figure 5:
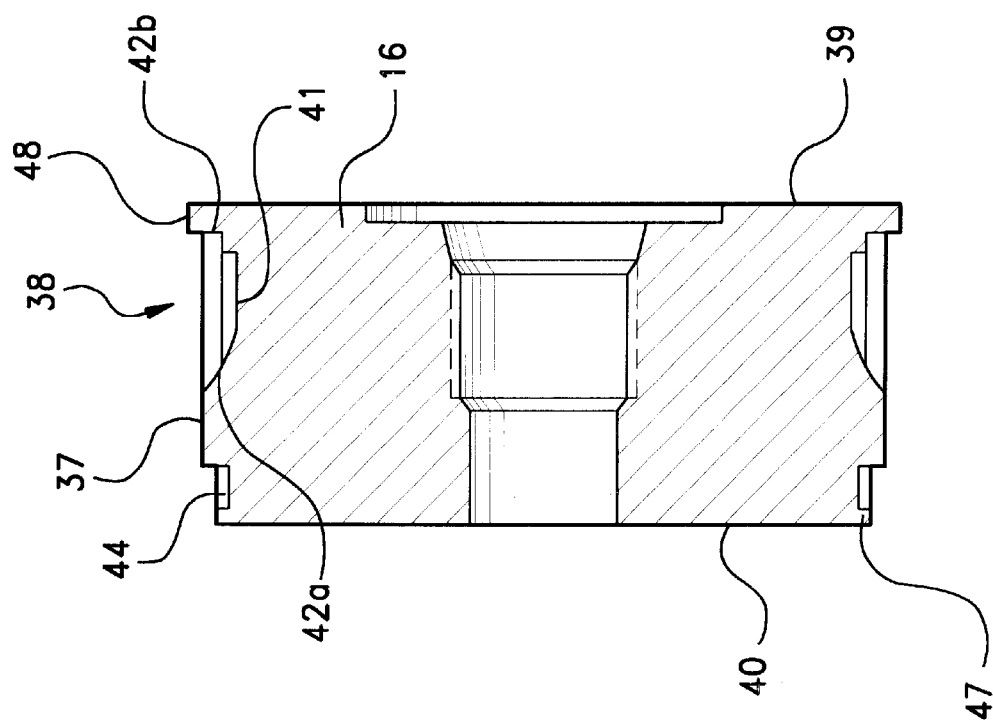
FIG. 5 is a cross-sectional side view of the end cap for the accumulator shown in FIG. 2.

According to the present invention, end caps 14, 16 are attached to the canister 12 in a permanent, fluid-tight manner, namely by mechanically deforming a portion of the canister into a channel or groove of the end cap. End cap 16 is shown in more detail in FIG. 5, and includes a cylindrical outer surface 37 having a dimension which is closely received within the canister. The end cap 16 also has an annular channel or groove, indicated generally at 38, formed in the outer surface, at a location preferably spaced from both axial ends 39, 40 of the end cap. The groove 38 preferably has a generally flat bottom 41, and sidewalls 42a, 42b which interconnect the bottom 41 of the groove with the outer surface 37. As illustrated, sidewall 42a has a rounded or curved shape, e.g., a radius, while sidewall 42b has a step or shoulder. The smooth rounded or curved shape creates a good surface for receiving the canister and creating a permanent and fluid-tight seal with the canister. The step in sidewall 42b provides resistance against torque during attachment of the canister in the fluid system. For some applications, particularly larger canisters with a larger crimped area between the end cap and the canister, the groove 38 could have a fully rounded (symmetrical) geometry as illustrated in FIG. 6. A deeper, axially shorter groove 44 is provided toward the inner axial end of the cap, which receives an O-ring 46 (FIG. 2) to ensure a fluid-tight seal with the canister 12. An annular lip 47 is provided at the axially inner end of the end cap, which has an outer diameter less than surface 37, that the O-ring 46 is exposed to pressure within the canister to maintain the O-ring 46 within groove 44.

A relatively thin annular flange 48 is provided at the axially outer end 39 of the plug, and projects radially outward a short distance past the outer surface 37. Flange 48 serves as a locating feature, to axially locate the cap in the canister when the accumulator is assembled.

End cap 14 preferably has the same type of structure as end cap 16, including a groove 38; O-ring 46, and flange 48, and will not be discussed further for sake of brevity. Again, while the accumulator is illustrated and described above as having two end caps, it should be appreciated that some applications may only require a single end cap of the type described herein, and the opposite end of the accumulator may be enclosed by other means (see, e.g., U.S. Pat. No. 3,837,334).

Figure 8:
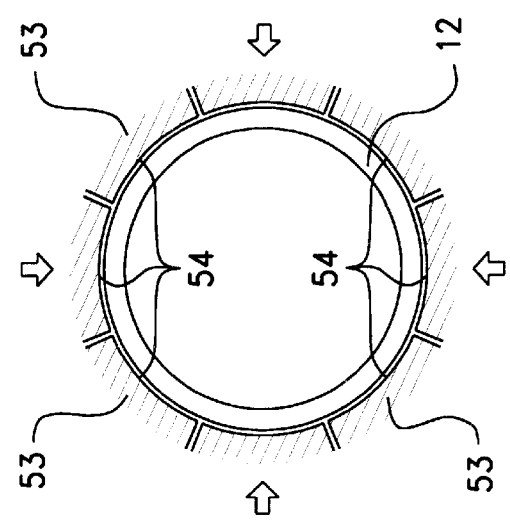
FIG. 8 is a front view of the accumulator, further illustrating the forming step of the accumulator.
Figure 7:
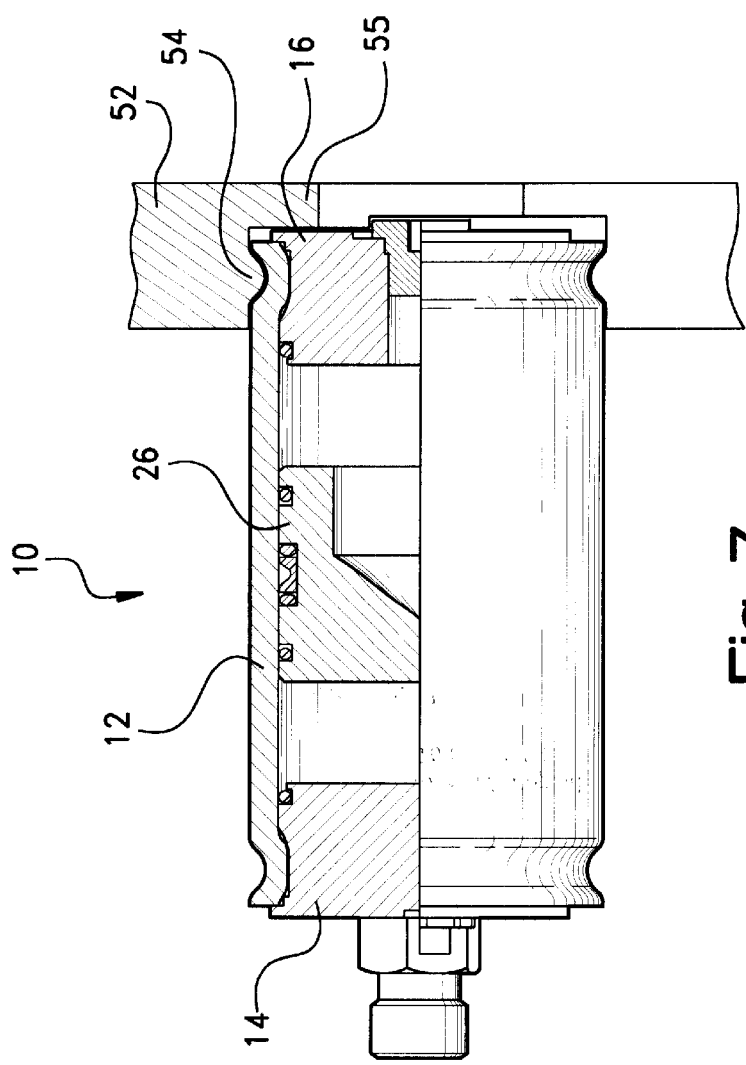
FIG. 7 is a side view in partial cross-section of the accumulator of FIG. 1, showing a forming step in the assembly of the accumulator.

In any case, the canister 12 is mechanically deformed into engagement with the end caps 14, 16 (that is, at least into engagement with the end cap having groove 38 as described above). Preferably, this is done by means of a crimping machine, which as shown in FIGS. 7–9, includes a die 52 which is segmented into a plurality of operating pieces, such as at 53; each of which has an inner operating surface 54 with a geometry intended to deform the canister into the groove 38. The die 52 has a backstop 55 (FIG. 9), i.e., an annular, radially-inward directed shoulder, which serves as a locating feature for the canister and end cap when the subassembly is inserted into the die during the forming process. Along with the flange on the end of the end cap, this ensures the forming of the canister takes place consistently and at the proper location for a permanent, fluid-tight attachment between the end cap and the canister.

During the forming process, the die is located around the canister (which is preferably vertically oriented), and when the die is operated, the segmented pieces force the canister into engagement with the end caps, and particularly, force the canister into direct and full contact with groove 38. Again, the rounded or curved sidewall(s) 42a, 42b and flat bottom 41 of the groove 38 provide a mechanical connection with the canister which increases the fatigue strength of the joint, and provides torque strength during installation of the accumulator in the fluid system. It has been found that such an accumulator can operate at pressures in excess of 4,000 psi without leakage, over an extended period of time.

While crimping is one preferred means for forming the canister into the groove, it should be appreciated that other mechanical forming methods could alternatively be used to form the canister in much the same way. These methods include, but are not limited to, cold-forming, magnaforming and staking, and generally any other method which achieves a permanent forming of the canister into the grooves.

During assembly, one end cap is inserted into an end of the canister, until the flange 48 engages the end of the canister. The subassembly is then inserted into the die, and the die is operated to form the canister around the end cap. The piston 26 is then inserted through the opposite end of the canister, followed by the opposite end cap, and the subassembly is then reversed, and inserted into the die from the other end, and the process is then repeated to attach the opposite end cap. The accumulator can then be connected within a fluid system and operated in a conventional manner, as should be well-understood.

As described above, the present invention is useful for an accumulator having a piston, but it should be appreciated that, without significant modification, the present invention is likewise useful for a bladder-type accumulator. As illustrated in FIG. 10, an accumulator, indicated generally at 70, is illustrated, having an outer canister 72 and a pair of end caps 73, 74, with essentially the same structure as the end caps 14, 16 of the first embodiment described above. The accumulator includes an elastic bladder 76, having a closed end 78 and an open end 79. The open end 79 of the bladder includes an integral, resilient annular flange 82 dimensioned to be received in inner groove 44 of end cap 74 to i) fix the open end of the bladder within the canister, and ii) create a fluid-tight seal between the gas chamber 27 and the fluid chamber 28. Flange 82 also provides a seal between the end cap 74 and the canister, similar to seal 46 described previously. A cup-shaped retainer 84 is provided at the opposite end of the canister and serves to receive the end of the bladder when the bladder is expanded to its maximum dimension. Retainer 84 likewise includes an annular flange 85 which is received in the groove 44 of end cap 73 to create a fluid-tight seal between the end cap 73 and the canister, similar to seal 46 described previously.

The accumulator of the second embodiment is assembled in much the same manner as the accumulator of the first embodiment, with one end cap being inserted into one end of the canister, and the canister then being mechanically deformed (in the manner described above) into firm, fluid-tight engagement with the end cap. The bladder 76 is then inserted into the opposite end of the canister and the opposite end cap is then attached as described above.

As should be appreciated, the piston and bladder structure described above is conventional, and operates in a conventional manner to absorb excess fluid volume in the fluid system. The operation of the accumulator is believed well-known, and will not be described herein for sake of brevity.

In either embodiment, the mechanical forming process is a relatively simple manufacturing step which is easily accomplished using conventional machinery.

As such, the present invention provides a novel and unique accumulator, and a method for attaching an end cap of an accumulator to a canister. The technique is relatively straightforward and maintains a permanent and fluid-tight attachment of the end cap to the canister.

The principles, preferred embodiments and modes of operation of the present invention have been described in the foregoing specification. The invention which is intended to be protected herein should not, however, be construed as limited to the particular form described as it is to be regarded as illustrative rather than restrictive. Variations and changes may be made by those skilled in the art without departing from the scope and spirit of the invention as set forth in the appended claims.

What is claimed is:

1. An accumulator including an elongated cylindrical canister and a piston located within the canister and slideable axially within the canister to divide the canister into separate chambers, the piston having a cylindrical peripheral surface, and sealing means disposed between the peripheral surface of the cylinder and the canister for providing a fluid-tight seal between the chambers; an end cap enclosing an end of the canister, the end cap having an outer cylindrical surface closely received in the canister, with an annular groove formed in the outer surface of the end cap at a location spaced from the axial ends of the end cap, the groove including a flat bottom and at least one sidewall with a rounded portion, the side wall interconnecting the flat bottom with the outer cylindrical surface of the end cap, the canister being mechanically formed into the groove to fix the end cap in a permanent and fluid tight manner to the canister.

2. The accumulator as in claim 1, wherein the at least one rounded sidewall is rounded from the flat bottom to the outer cylindrical surface of the end cap.

3. The accumulator as in claim 1, wherein the canister is formed into direct contact with the end cap groove.

4. An accumulator including an elongated cylindrical canister and a piston located within the canister and slideable axially within the canister to divide the canister into separate chambers, the piston having a cylindrical peripheral surface, and sealing means disposed between the peripheral surface of the cylinder and the canister for providing a fluid-tight seal between the chambers; an end cap enclosing an end of the canister, the end cap having an outer cylindrical surface closely received in the canister, with an annular groove formed in the outer surface of the end cap at a location spaced from the axial ends of the end cap, the end cap including an annular, radially outward projecting flange at an outer axial end of the end cap, the flange engaging an end of the canister and locating the end cap with respect to the canister when the end cap is inserted into the canister, the canister being mechanically formed into the groove to fix the end cap in a permanent and fluid tight manner to the canister.

5. The accumulator as in claim 1, wherein the end cap includes an annular seal groove on an inner axial end of the end cap, and a resilient annular seal located in the seal groove, the seal exposed to pressure within the canister and providing a fluid-tight seal with the canister.

6. An accumulator including an elongated cylindrical canister, an elastic bladder located within the canister and dividing the canister into separate chambers, and sealing means disposed between an open end of the bladder and the canister for providing a fluid-tight seal between the chambers, and end cap enclosing an end of the canister, the end cap having an outer cylindrical surface closely received in the canister, with an annular groove formed in the outer surface of the end cap at a location spaced from the axial ends of the end cap, the groove including a flat bottom and at least one sidewall with a rounded portion, the side wall interconnecting the flat bottom with the outer cylindrical surface of the end cap, the canister being mechanically formed into the groove to fix the end cap in a permanent and fluid tight manner to the canister.

7. The accumulator as in claim 6, wherein the at least one rounded sidewall is rounded from the flat bottom to the outer cylindrical surface of the end cap.

8. The accumulator as in claim 6, wherein the canister is formed into direct contact with the end cap groove.

9. An accumulator including an elongated cylindrical canister, an elastic bladder located within the canister and and dividing the canister into separate chambers, and sealing means disposed between an open end of the bladder and the canister for providing a fluid-tight seal between the chambers; an end cap enclosing an end of the canister, the end cap having an outer cylindrical surface closely received in the canister, with an annular groove formed in the outer surface of the end cap at a location spaced from the axial ends of the end cap, the end cap including an annular, radially outward projecting flange at an outer axial end of the end cap, the flange engaging an end of the canister and locating the end cap with respect to the canister when the end cap is inserted into the canister, the canister being mechanically formed into the groove to fix the end cap in a permanent and fluid tight manner to the canister.

10. The accumulator as in claim 6, wherein the end cap includes an annular seal groove on an inner axial end of the end cap, and a resilient annular seal located in the seal groove, the seal exposed to pressure within the canister and providing a fluid-tight seal with the canister.

11. An accumulator for a fluid system, comprising:

an elongated cylindrical canister;

responsive means located within the canister to absorb under pressure excess fluid capacity in the fluid system, said responsive means dividing the canister into a pair of chambers;

sealing means between the responsive means and the canister for providing a fluid-tight seal between the chambers; and an end cap enclosing an end of the canister, the end cap having an outer cylindrical surface closely received in the canister, with an annular groove formed in the outer surface of the end cap at a location spaced from the axial ends of the end cap, the groove including a flat bottom and at least one sidewall with a rounded portion, the side wall interconnecting the flat bottom with the outer cylindrical surface of the end cap, the canister being mechanically formed into the groove to fix the end cap in a permanent and fluid tight manner to the canister.

12. The accumulator as in claim 11, wherein the at least one rounded sidewall is rounded from the flat bottom to the outer cylindrical surface of the end cap.

13. The accumulator as in claim 11, wherein the canister is formed into direct contact with the end cap groove.

14. An accumulator including an elongated cylindrical canister, a responsive means located within the canister to absorb under pressure excess fluid capacity in the fluid system, said responsive means dividing the canister into a pair of chambers; and sealing means disposed between the responsive means and the canister for providing a fluid-tight seal between the chambers; an end cap enclosing an end of the canister, the end cap having an outer cylindrical surface closely received in the canister, with an annular groove formed in the outer surface of the end cap at a location spaced from the axial ends of the end cap, the end cap including an annular, radially outward projecting flange at an outer axial end of the end cap, the flange engaging an end of the canister and locating the end cap with respect to the canister when the end cap is inserted into the canister, the canister being mechanically formed into the groove to fix the end cap in a permanent and fluid tight manner to the canister.

15. The accumulator as in claim 11, wherein the end cap includes an annular seal groove on an inner axial end of the end cap, and a resilient annular seal located in the seal groove, the seal exposed to pressure within the canister and providing a fluid-tight seal with the canister.

16. A method for assembling an accumulator, comprising:

providing an elongated cylindrical canister;

locating responsive means within the canister to absorb under pressure excess fluid capacity in the fluid system, said responsive means dividing the canister into a pair of chambers and having sealing means between the responsive means and the canister for providing a fluid-tight seal between the chambers;

inserting an end cap into an end of the canister to enclose the end of the canister, the end cap having an outer cylindrical surface closely received in the canister, and an annular groove formed in the outer surface of the end cap at a location spaced from the axial ends of the end cap, and an annular, radially projecting flange at an outer axial end of the end cap, wherein the flange contacts the end of the canister to locate the end cap with respect to the canister; and mechanically forming the canister into the groove to fix the end cap in a permanent and fluid tight manner to the canister.

17. The method as in claim 16, wherein the canister is crimped into the groove.

18. The method as in claim 16, wherein the canister is formed into direct contact with the end cap groove.

19. The accumulator as in claim 1, wherein the mechanical formation of the canister occurs at a location spaced from the end of the canister.

20. The accumulator as in claim 6, wherein the mechanical formation of the canister occurs at a location spaced from the end of the canister.

21. The accumulator as in claim 11, wherein the mechanical formation of the canister occurs at a location spaced from the end of the canister.

22. The method as in claim 16, wherein said mechanically forming step occurs at a location spaced from the end of the canister.

* * * * *